June 30, 1970 W. HAHN 3,517,831
MACHINE FOR LOADING AND UNLOADING OF PALLETS
Filed June 6, 1968 2 Sheets-Sheet 1

INVENTOR:
WINFRIED HAHN
BY Michael S. Striker
his ATTORNEY

June 30, 1970           W. HAHN           3,517,831

MACHINE FOR LOADING AND UNLOADING OF PALLETS

Filed June 6, 1968           2 Sheets-Sheet 2

INVENTOR:
WINFRIED HAHN

BY: Michael S. Striker
his ATTORNEY

United States Patent Office 3,517,831
Patented June 30, 1970

3,517,831
MACHINE FOR LOADING AND UNLOADING OF PALLETS
Winfried Hahn, Dortmund-Brackel, Germany, assignor to Holstein & Kappert Maschinenfabrik Phonix G.m.b.H., Dortmund, Germany
Filed June 6, 1968, Ser. No. 734,992
Claims priority, application Germany, June 24, 1967, 1,506,925
Int. Cl. B65g 60/00, 57/10
U.S. Cl. 214—6      13 Claims

ABSTRACT OF THE DISCLOSURE

A machine for loading or unloading of pallets comprises a first conveyor which advances empty or filled bottles, a second conveyor which advances empty or loaded crates for bottles, a third conveyor which is disposed between the first and second conveyors and comprises a table which is movable up and down and supports one or more pallets at a time, and a transfer unit which is reciprocable at a level above the three conveyors and has first and second transfer devices which are respectively provided with grippers for bottles and crates. In one end position of the transfer unit, the first transfer device accepts bottles from or delivers bottles to the first conveyor while the second transfer device delivers crates to or accepts crates from the third conveyor. In the other end position of the transfer unit, the first transfer device delivers bottles to or accepts bottles from crates on the third conveyor and the second transfer device accepts crates from or delivers crates to the second conveyor. In this way, one of the transfer devices invariably carries goods when the transfer unit moves between its end positions.

BACKGROUND OF THE INVENTION

The present invention relates to improvements in machines for loading or unloading of pallets or analogous platforms, particularly for loading pallets with or unloading from pallets two classes of goods, such as empty or filled bottles or cans and empty or filled crates.

Presently known pallet loading or unloading machines normally comprise a first conveyor which transports loaded or empty pallets to a first transfer station, a second conveyor which serves to receive goods from or to deliver goods to a second transfer station adjacent to the first transfer station, and a transfer device which moves between the two transfer stations to deliver goods from loaded pallets at the first station to the second conveyor at the second station, or to deliver goods from the second transfer station to empty or partially loaded pallets at the first station. In other words, the transfer device carries goods when it travels from the one to the other station but is empty when it travels in the opposite direction. When the pallets are loaded with empty or filled crates which contain bottles or the like, the crates are filled with or relieved of bottles at a station other than the first transfer station. Therefore, a complete crate filling and pallet loading assembly occupies much space and comprises a large number of parts.

SUMMARY OF THE INVENTION

It is an object of the present invention to provide a novel machine which can transport to and from pallets not one but two classes of goods and which can carry out such operations in a space- and time-saving manner.

Another object of the invention is to provide a machine of the just outlined character which is particularly suited for unloading of crates from or for loading of crates onto successive pallets and which can simultaneously fill such crates with or relieve the crates of bottles or like containers.

A further object of the invention is to provide a machine which can load one group of pallets with empty or filled crates and simultaneously unloads crates from or loads crates onto a second group of pallets.

An additional object of the invention is to provide a machine wherein the devices which transfer goods to or from pallets perform useful work not only when they travel toward but also when they move away from registry with the pallets.

A concomitant object of the invention is to provide novel and improved transfer devices and transfer units which can be utilized in a machine of the above outlined character.

The improved machine is employed for loading or unloading pallets of the type which carry two classes or groups of goods whereby the two classes may but need not contain identical goods.) The machine comprises first conveyor means for one class of goods (for example, bottles), second conveyor means for the other class of goods (for example, crates or boxes), pallet-supporting third conveyor means located between the first and second conveyor means, and a transfer unit including first and second transfer devices disposed at a level above the conveyor means and each having gripper means for a different class of goods. The transfer unit is movable between a first position in which the first and second transfer devices respectively register with the first and third conveyor means and a second position in which the first and second transfer devices respectively register with the third and second conveyor means. Consequently, the first transfer device can transport one class of goods between the first conveyor means and the pallet or pallets on the third conveyor means, and the second transfer device can transport another class of goods between the pallet or pallets on the third conveyor means and the second conveyor means.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
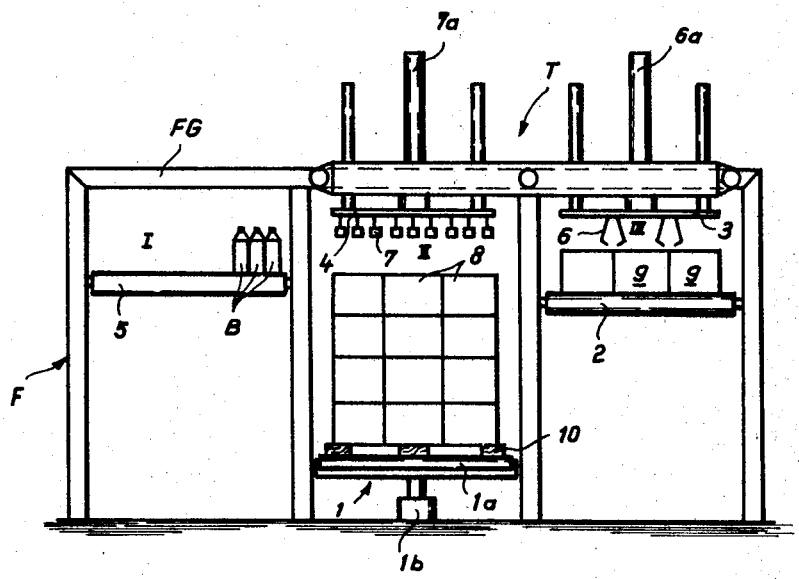
FIG. 1 is a somewhat schematic side elevational view of a machine which can be used for loading or unloading of pallets and which is designed to transport two classes of goods, namely, empty or filled bottles and empty or filled crates for bottles.

Referring first to FIG. 1, there is shown a portion of a machine which can be utilized for unloading of pallets 10. The machine comprises a frame F for three conveyors including a first conveyor 5 which may comprise an endless belt or chain serving to transport arrays of bottles B or analogous goods, a second conveyor 2 which may comprise a roller conveyor serving to transport arrays of empty crates 9 or analogous goods, and a third conveyor 1 which is flanked by the conveyors 2, 5 and serves to transport pallets 10 with stacks of layers of filled crates 8 (i.e., each crate contains a plurality of bottles B). The third conveyor 1 comprises a table 1a which can support a pallet 10 and means 1b for moving the table 1a to different levels. The moving means 1b may comprise one or more hydraulically or pneumatically operated lifting and lowering cylinder and piston assemblies.

The machine of FIG. 1 further comprises a transfer unit T which is reciprocable along guide means FG of the frame F so that it moves in a horizontal path between two end positions. This transfer unit T comprises a first transfer device 4 which is provided with a set of grippers 7 serving to lift or lower bottles B, and a second transfer device 3 which has tongs or analogous grippers 6 serving to lift and lower sets of empty crates 9. The arrangement is such that the grippers 7 register with the conveyor 5 when the grippers 6 register with the conveyor 1 (in one end position of the transfer unit T), and that the grippers 7 register with the conveyor 1 when the grippers 6 register with the conveyor 2 (in the other end position of the transfer unit T). The operation of the conveyor 5 is preferably synchronized with that of the conveyor 2 so that the conveyor 2 moves a layer of bottles B away from the transfer station I shown in FIG. 1 when the conveyor 2 removes from a second transfer station II a layer of empty crates 9. The table 1a of the conveyor 1 is movable stepwise in upward direction in synchronism with the operation of conveyors 2 and 5.

The operation is as follows:

A loaded pallet 10 supporting, for example, five layers of loaded crates 8 is delivered onto the table 1a of the third conveyor 1 while the moving means 1b maintains the table 1a in its lower end position. The transfer unit T is maintained in the end position which is shown in FIG. 1 so that the grippers 7 of the transfer device 4 are located at the transfer station II, i.e., at a level above the uppermost layer of loaded crates 9 on the table 1a. The transfer device T has a lowering and lifting means 7a which can lower the grippers 7 so that they descend and engage the bottles B in the uppermost layer of loaded crates 9, and the grippers 7 are then caused to move upwardly so as to raise the bottles B above the level of the thus evacuated crates on the table 1a. In the next step, the transfer unit T is caused to move to its left-hand end position in which the grippers 7 register with the first conveyor 5 at the transfer station I. The means 7a then causes the grippers 7 to descend and to deposit the bottles B on the conveyor 5. At the same time, the transfer device 3 registers with the conveyor 1 at the station II and its lifting and lowering means 6a causes the grippers 6 to descend and to engage the uppermost layer of crates on the table 1a (such crates are empty because their contents were removed by the grippers 7). The grippers 7 are then moved upwardly and away from the bottles B on the conveyor 5 and the grippers 6 are also moved upwardly to lift the layer of empty crates above and away from the uppermost layer of loaded crates 8. The transfer unit T then returns to the end position of FIG. 1 and the means 6a is caused to lower the layer of empty crates 9 onto the second conveyor 2 at the transfer station III. This is the position of the crates 9, bottles B and grippers 6, 7 as shown in FIG. 1. In the meantime, the moving means 1b of the third conveyor 1 causes the table 1a to rise by a step so as to place the uppermost layer of loaded crates 8 within reach of grippers 6 on the transfer device 3. The grippers 6 are lifted above the level of empty crates 9 on the second conveyor 2 and the drives for the conveyors 2, 5 are set in motion to advance the conveyors by a step so that these conveyors are ready to receive fresh layers of crates and bottles. The same operation is then repeated again and again until the grippers 6 remove the last layer of crates from the pallet 10. The table 1 is then returned to its lower end position and the empty pallet 10 is replaced with a loaded pallet by means of a suitable supply conveyor which is not shown in the drawing. The conveyor 2 may transport empty crates 9 to a loading machine where the crates are loaded with filled bottles. The conveyor 5 can transport empty bottles B to a bottle cleaning, sterilizing and filling machine, not shown.

It is clear that the machine of FIG. 1 can be used for loading of empty pallets 10. The gripping device 4 then delivers layers of filled or empty bottles B and the transfer device 3 delivers layers of empty crates 9. When a layer of empty crates 9 is deposited onto a pallet which rests on the table 1a (in the latter's upper end position), the transfer device 4 deposits into the crates a layer of empty or filled bottles B. The table 1a then descends so that the transfer device 3 can deposit a fresh layer of empty crates 9 on top of the first layer of filled crates 8. The same procedure is repeated as often as necessary to accumulate on the pallet a requisite number of layers of filled crates 8. The grippers 7 are preferably of the type which is commonly employed in machines for transporting bottles into and from crates; each such gripper 7 may comprise a bell-shaped head which can be lowered onto and around the top of a bottle and which accomodates a diaphragm adapted to be flexed by compressed air or the like to grip the head of the bottle and to hold the bottle during transport from the first conveyor 5 to the third conveyor 1 or vice versa.

An important advantage of the machine shown in FIG. 1 is that the crates can be loaded or unloaded simultaneously with transfer onto or removal from the pallets at the station II defined by the table 1a. Thus, the machine of FIG. 1 dispenses with a separate assembly which is used in conventional machines for introduction of bottles into or for withdrawal of bottles from boxes, crates or like receptacles.

Each of the transfer devices 3, 4 may comprise a carriage which supports a requisite number of grippers 6, 7. The two carriages are coupled to each other to form the transfer unit T which can be reciprocated along the guide means FG by means of hydraulic or pneumatic cylinders, rack and pinion drives or analogous reciprocating means. The transfer unit T is provided with holder means which support the carriages for movement up and down in response to actuation of the lifting means 6a or 7a.

Figure 2:
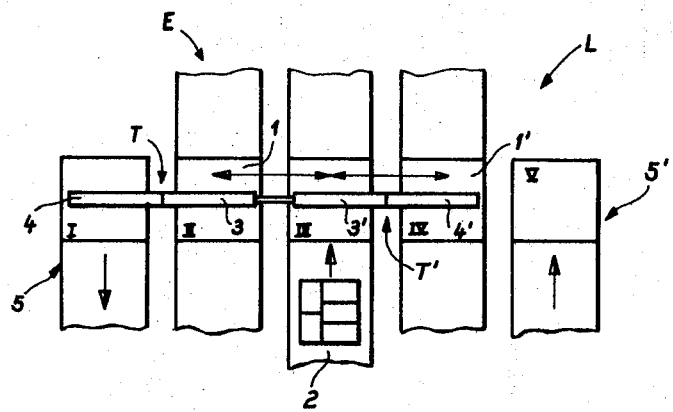
FIG. 2 is a schematic top plan view of a second machine which comprises a loading apparatus and an unloading apparatus.

FIG. 2 is a schematic top plan view of a second machine which comprises all of the structure shown in FIG. 1 as well as a fourth conveyor 1' and a fifth conveyor 5'. The fourth conveyor 1' is flanked by the fifth conveyor 5' and second conveyor 2 and also comprises a table and means for moving the table to different levels. The conveyors 5, 1, 2 form part of an unloading apparatus E and the conveyors 2, 1', 5' form part of a loading apparatus L.

The machine of FIG. 2 comprises two transfer units T, T' which are connected to each other so that they can move together at a level above the conveyors 5, 1, 2, 1', 5'. The conveyor 5 removes layers of empty bottles from the transfer station I where it accepts layers of empty bottles from the transfer device 4 of the transfer unit T, and the conveyor 5' delivers layers of filled bottles to the transfer station V where the layers of filled bottles are accepted by the transfer device 4' of the transfer unit T'. The transfer device 3 of the unit T transfers layers of empty crates from the table of the conveyor 1 (station II) onto the conveyor 2 (station III), and the transfer device 3' of the unit T' transfers empty crates from the station III onto the table of the conveyor 1' (station IV). Such crates then receive layers of filled bottles from the transfer device 4' when the latter moves from station V to station IV. In order that the unloading apparatus E may be operated independently of the loading apparatus L, or vice versa, the machine of FIG. 2 comprises the conveyor 2 (or an additional conveyor, not shown)

which can transport empty or filled crates to and/or from the station III.

It is clear that the transfer units T, T' can be provided with separate drives. Moreover, the transfer unit T may be offset from the transfer unit T' so that empty crates delivered to station III by the device 3 must advance by a step in order to move into registry with the transfer device 3' of the unit T'. However, the arrangement which is shown in FIG. 2 (wherein the station III which receives layers of empty crates from the transfer device 3 of the transfer unit T coincides with the transfer station at which the transfer device 3' of the transfer unit T' picks up layers of empty crates) has been found to be particularly suitable for my purposes because it occupies very little room and because the transfer units T, T', can be directly coupled to each other for simultaneous movement between two end positions.

An additional advantage of the machine shown in FIG. 2 is that empty crates need not be removed since they are loaded with fresh bottles right at the transfer station IV defined by the conveyor 1'. Also, and since the array of crates in the layers which are transported between the pallets on the conveyors 1 and 1' remains intact, the machine of FIG. 2 need not be provided with separate arraying devices which are used in conventional palletizing machines to assemble two or more crates in arrays or layers, for example, in arrays of five crates one of which is shown in FIG. 2 on the conveyor 2 just upstream of the station III.

The conveyor 2 (or a further conveyor) which delivers crates to or removes crates from the station III is put to use when the apparatus E or L is not in use and also if one of these apparatuses is out of commission; the conveyor 2 then enables the operators to utilize the apparatus E independently of the apparatus L or vice versa.

Figure 3:
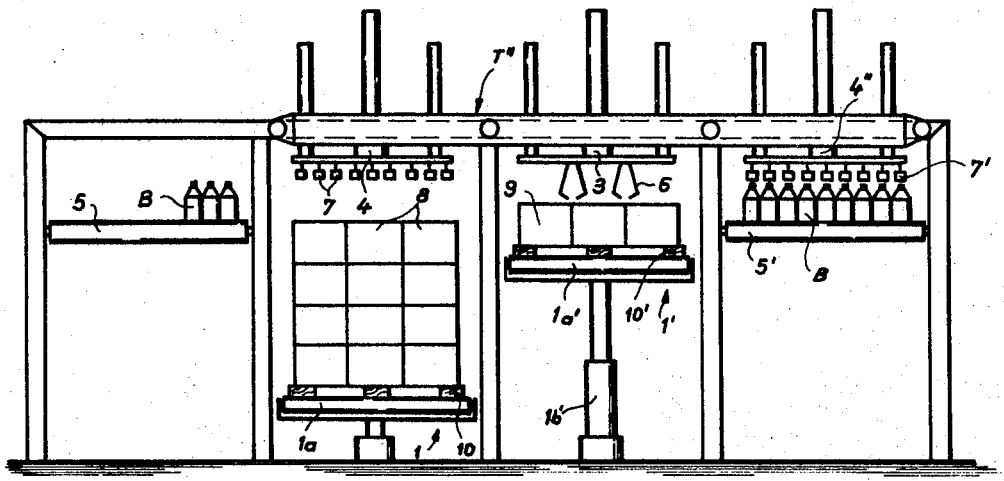
FIG. 3 is a side elevational view of a third machine which constitutes a simplification of the machine shown in FIG. 2.
Figure 4:
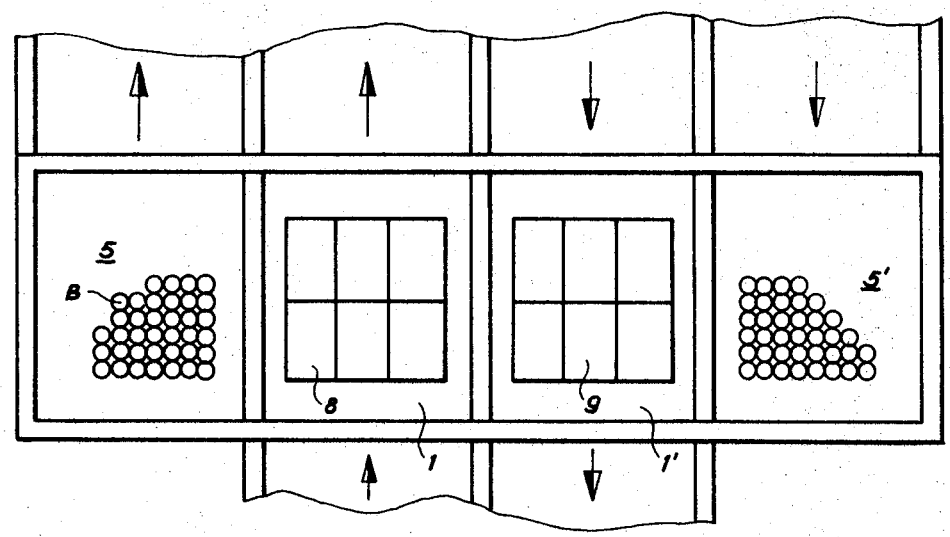
FIG. 4 is a top plan view of a portion of the machine shown in FIG. 3.

FIGS. 3 and 4 illustrate a portion of a third machine which is somewhat similar to the machine of FIG. 2 but comprises only four conveyors 5, 1, 1', 5'. In this embodiment of my invention, the conveyor 1' performs the function of the conveyor 2 of FIG. 1 and the function of the fourth conveyor 1' of FIG. 2. The transfer unit T'' of FIGS. 3 and 4 comprises three transfer devices 4, 3 and 4''. The table 1a' of the conveyor 1' is shiftable up and down by a moving means 1b' and serves to accommodate at least one pallet 10' at a time.

The operation is as follows:

The transfer device 4 transports a layer of empty bottles B from the topmost layer of crates 8 on the table 1a of the conveyor 1. At the same time, the grippers 6 of the transfer device 3 travel from the conveyor 1' into registry with the thus evacuated crates on the table 1a of the conveyor 1. Furthermore, the grippers 7' of the transfer device 4'' deliver a layer of filled bottles B'' from the conveyor 5' into empty crates 9 on the table 1a' of the conveyor 1'. In the next step, the table 1a is lifted by a step and the table 1a' is lowered by a step. The transfer unit T'' then moves back to the end position shown in FIG. 3 whereby the grippers 7 are empty, the grippers 6 transport a layer of empty crates from the conveyor 1 to the conveyor 1', and the grippers 7' are also empty. The same procedure is repeated as often as necessary.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

I claim:

1. A machine for loading and unloading pallets comprising, in combination, first conveyor means for conveying bottles; second conveyor means for conveying crates; third pallet supporting conveyor means located between said bottle conveyor means and said crate conveyor means and including table means and means for moving the table means to different levels; a transfer unit including a first transfer device having gripper means for transferring bottles between said bottle conveyor means and said pallet supporting conveyor means and a second transfer device having gripper means for transferring crates between said crate conveyor means and said pallet supporting conveyor means, said unit including said transfer devices thereon being arranged at a level above the three conveyor means and said unit being movable between a first position in which said first and second transfer devices respectively register with said bottle conveyor means and said pallet supporting conveyor means and a second position in which said first and second transfer devices respectively register with said pallet supporting conveyor means and with said crate conveyor means; and means connected to at least said grippers of at least said first transfer device for raising and lowering the same so that the bottles may be placed in or removed from the crates.

2. A machine as defined in claim 1, wherein at least one of said first and second conveyor means comprises a roller conveyor.

3. A machine as defined in claim 1, wherein at least one of said first and second conveyor means comprises an endless conveyor.

4. A machine as defined in claim 1, further comprising fourth conveyor means for conveying bottles, said second conveyor means being disposed between said third and fourth conveyor means, said transfer unit comprising a third transfer device movable with said first and second transfer devices to respectively register with said second and fourth conveyor means in the first and second positions of said transfer unit.

5. A machine as defined in claim 4, wherein said second conveyor means comprises table means and means for moving the table means of said second conveyor means to different levels.

6. A machine as defined in claim 4, wherein said first and third transfer devices are arranged to transfer bottles and said second transfer device is arranged to transport crates for bottles.

7. A machine as defined in claim 4, further comprising additional conveyor means for transporting pallets to and from at least one of said second and third conveyor means.

8. A machine as defined in claim 1, further comprising fourth conveyor means adjacent to said second conveyor means and fifth conveyor means adjacent to said fourth conveyor means, said fourth conveyor means being disposed between said second and fifth conveyor means, and a second transfer unit disposed above said conveyor means and having first and second additional transfer devices, said second transfer unit being movable between a first position in which the second and first additional transfer devices respectively register with said second and fourth conveyor means and a second position in which said second and first additional transfer devices respectively register with said fourth and fifth conveyor means, each of said additional transfer devices having gripper means.

9. A machine as defined in claim 8, wherein the gripper means of said first transfer device and said first additional transfer device are designed to transfer bottles and the gripper means of said second transfer device and said second additional transfer device are desgined to transport crates for bottles.

10. A machine as defined in claim 8, wherein said third and fourth conveyor means comprises for moving pallets to different levels.

11. A machine as defined in claim 8, wherein said first mentioned transfer unit is coupled for movement with said second transfer unit.

12. A machine as defined in claim 8, further comprising conveyor means for transporting at least one class of goods to said second conveyor means.

13. A machine as defined in claim 1, wherein said first, said second and said third conveyor means extend substantially parallel to each other and wherein said transfer unit is movable along a path transverse to the three conveyor means.

References Cited

UNITED STATES PATENTS

| | | | |
|---|---|---|---|
| 2,579,094 | 12/1951 | Rooksby | 214—6 X |
| 3,037,644 | 6/1962 | Segur | 214—6 |
| 3,050,199 | 8/1962 | McGrath et al. | 214—6 |
| 3,185,328 | 5/1965 | Dardaine et al. | 53—166 X |
| 3,258,808 | 7/1966 | Ashford | 214—309 X |
| 3,312,327 | 4/1967 | Clapp et al. | 214—6 X |
| 3,367,823 | 2/1968 | Clausen et al. | |
| 3,392,851 | 7/1968 | Pearne et al. | 214—6 |
| 3,404,788 | 10/1968 | Thomas et al. | 214—6 |

FOREIGN PATENTS

| | | |
|---|---|---|
| 914,957 | 1/1963 | Great Britain. |

ROBERT C. SHERIDAN, Primary Examiner

R. J. SPAR, Assistant Examiner

U.S. Cl. X.R.

53—166; 214—309